United States Patent
Soika et al.

(10) Patent No.: US 9,496,072 B2
(45) Date of Patent: Nov. 15, 2016

(54) ARRANGEMENT HAVING A SUPERCONDUCTING CABLE

(75) Inventors: Rainer Soika, Hannover (DE); Mark Stemmle, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/623,849

(22) Filed: Nov. 23, 2009

(65) Prior Publication Data

US 2010/0152049 A1    Jun. 17, 2010

(30) Foreign Application Priority Data

Dec. 15, 2008 (EP) .................................. 08291180

(51) Int. Cl.
*H01B 12/02* (2006.01)
*H02H 7/00* (2006.01)

(52) U.S. Cl.
CPC .............. *H01B 12/02* (2013.01); *H02H 7/001* (2013.01); *Y02E 40/641* (2013.01); *Y02E 40/68* (2013.01)

(58) Field of Classification Search
CPC ......... H01B 12/00–12/02; H02H 7/00–7/001; Y02E 40/64–40/68
See application file for complete search history.

(56) References Cited

U.S. PATENT DOCUMENTS

2005/0056456 A1* 3/2005 Ladie' ................... H01B 12/16
                                                      174/125.1
2006/0211579 A1* 9/2006 Yamaguchi ........... H01B 12/14
                                                      505/230

* cited by examiner

*Primary Examiner* — Colleen Dunn
(74) *Attorney, Agent, or Firm* — Sofer & Haroun, LLP

(57) ABSTRACT

An arrangement is specified having a superconducting cable (SK) which comprises a superconducting conductor (1) and a superconducting screen (3) which concentrically surrounds the same with the interposition of a dielectric (2). The cable (SK) is surrounded by a cryostat (KR) enclosing a free space (FR) for a coolant to be passed through, which cryostat (KR) which cryostat comprises two metallic tubes (4, 5) which are arranged concentrically with respect to one another and between which vacuum insulation is arranged. The screen (3) is composed of a superconducting material whose electrical resistance value in the normally conductive state is greater by a factor of at least 50 than the electrical resistance value of the material used for the conductor (1) in the normally conductive state.

13 Claims, 2 Drawing Sheets

ARRANGEMENT HAVING A SUPERCONDUCTING CABLE

RELATED APPLICATION

This application claims the benefit of priority from European Patent Application No. 08 291 180.1, filed on Dec. 15, 2008, the entirety of which is incorporated by reference.

BACKGROUND

Field of the Invention

The invention relates to an arrangement having a superconducting cable, which comprises a superconducting conductor and a superconducting screen which concentrically surrounds the same with the interposition of a dielectric, which cable is surrounded by a cryostat, enclosing a free space for a coolant to be passed through, which cryostat comprises two metallic tubes which are arranged concentrically with respect to one another and between which vacuum insulation is arranged (WO 03/052775 A1).

Description of Related Art

In modern technology, a superconducting cable has electrical conductors composed of a composite material which contains ceramic material which changes to the superconducting state at sufficiently low temperatures. The electrical direct-current resistance of a correspondingly designed conductor is zero when adequate cooling is provided, provided that a specific current level is not exceeded. By way of example, suitable ceramic materials are YBCO (yttrium-barium-copper oxide) or BSCCO (bismuth-strontium-calcium-copper oxide). By way of example, sufficiently low temperatures to change a material such as this to the superconducting state are between 67 K and 110 K. By way of example, suitable coolants are nitrogen, helium, neon and hydrogen or mixtures of these substances.

In the arrangement according to the initially cited WO 03/052775 A1, a superconducting cable is used with a cold dielectric. This comprises an inner conductor, which is applied to a tubular support, and a screen which is arranged concentrically with respect thereto, which are held separated from one another and at a distance by the dielectric (insulation). By way of example, the conductor and the screen are composed of strips of superconducting material, such as YBCO or BSCCO, which are wound around a substrate, lying closely alongside one another, with a long lay length. This known superconducting cable is designed such that the superconducting screen externally screens the magnetic field of the superconducting conductor during fault-free operation. The cable impedance changes only insignificantly when a short circuit occurs. The short-circuit current results in a large amount of energy being introduced, to be precise both into the conductor and into the screen of the cable, which can lead to destruction (burn-out) of the cable.

OBJECTS AND SUMMARY

The invention is based on the object of designing the arrangement described initially such that the effects of a short circuit can be considerably reduced.

According to the invention, this object is achieved in that the screen is composed of a superconducting material whose electrical resistance value in the normally conductive state is greater by a factor of at least 50 than the electrical resistance value of the material used for the conductor in the normally conductive state.

When a short circuit occurs, the energy which is introduced into the cable leads to a temperature increase. This temperature increase and the short-circuit current, which is greater than the rated current, lead to the superconducting materials of the conductor and screen changing from their superconducting state to the normally conductive state. Because of its high electrical resistance value, the screen then carries a current which is negligible, as a result of which it loses its screening effect. The magnetic field of the conductor can thus propagate virtually without any impediment. This directly results in a considerable increase in the inductance of the conductor, that is to say an increase in its electrical impedance. The short-circuit current flowing through the conductor is thus noticeably and quickly limited. The heating which occurs as a result of a high short-circuit current in known cables is correspondingly reduced.

The effect of limiting the short-circuit current can be enhanced by additionally fitting a layer composed of ferromagnetic material outside the screen.

Ferromagnetic materials which can be used for a layer such as this are all materials which have a relative permeability $\mu_r$ of greater than 10. The layer of ferromagnetic material which is arranged outside the screen enters the magnetic field produced by the conductor in the cable in the event of a short circuit, and results in a further increase in the inductance of the conductor, that is to say a further increase in its electrical impedance. This effect of the layer composed of ferromagnetic material is further enhanced by re-magnetization losses which occur therein when the superconducting cable is an alternating-current cable. In addition, the ferromagnetic material screens the magnetic field of the conductor of the cable on the outside. It is therefore virtually impossible for electromagnetic interference to occur for equipment located outside the cryostat. In addition, forces acting on other cable phases close by are reduced.

The layer composed of ferromagnetic material can be arranged on the external circumference of the cryostat. In this case, the outer tube of the cryostat can advantageously itself be composed of the ferromagnetic material. A material with a high relative permeability $\mu_r$ is preferably used as the ferromagnetic material. It is possible to use not only a material with high hysteresis losses, but also a material with low hysteresis losses, depending on the desired cable behaviour in the event of a short-circuit current. The layer composed of ferromagnetic material is also electrically conductive, in the same way as all metallic materials. It can therefore be heated by magnetic hysteresis and by eddy currents under the influence of a magnetic alternating field which may originate from the conductor in the cable. However, in the preferred embodiment of the arrangement, this heating occurs outside the cryostat, as a result of which the cable itself as well as the cooling medium are not heated by it. Because there is therefore little heating, the cooling-down times are reduced, as a result of which the cable can be used again more quickly. The reduced heating also reduces the mechanical load on the various components in the arrangement. Finally, the coolant is also unaffected by the heating of the ferromagnetic layer. Since only a small amount of cooling power is also required, because of the reduced short-circuit current, the design of the cooling installation can also be simplified in this preferred embodiment of the arrangement.

If a material with very low hysteresis losses is used for the layer composed of ferromagnetic material, then the layer is heated only insignificantly by any alternating field which may be produced by the conductor in the cable. A material such as this advantageously has a high relative permeability $\mu_r$. Particularly when using a material such as this, the layer composed of ferromagnetic material can also be arranged within the cryostat. By way of example, it can then directly surround the cable screen. In this embodiment of the cable, the inner tube of the cryostat could also be composed of the ferromagnetic material.

BRIEF DESCRIPTION OF THE DRAWINGS

Exemplary embodiments of the subject matter of the invention are illustrated in the drawings, in which.

DETAILED DESCRIPTION

Figure 1:
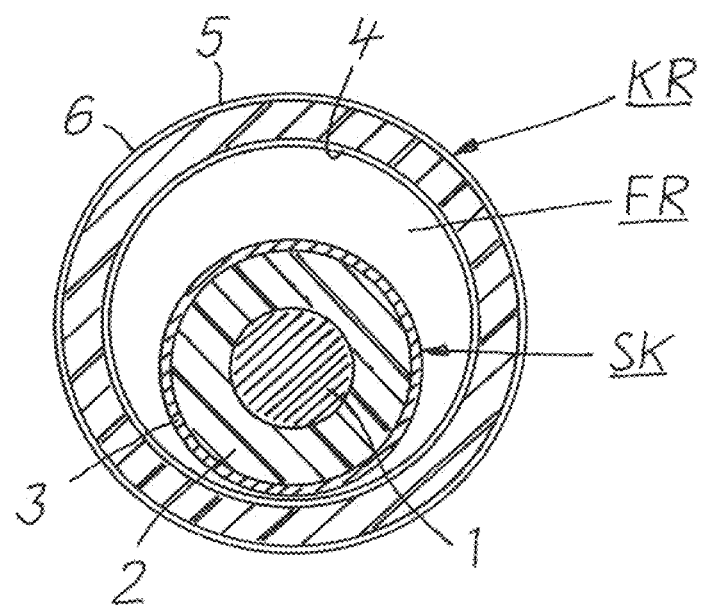
FIGS. 1 to 3 show cross sections through three arrangements of different design according to the invention, in the form of a schematic illustration.

As shown in FIG. 1, the arrangement comprises a superconducting cable SK and a cryostat KR surrounding it. In addition, the cryostat KR encloses a free space FR through which a coolant, for example nitrogen, is passed during operation of the arrangement.

The superconducting cable SK comprises a superconducting conductor 1, a dielectric 2 which surrounds it and acts as insulation, and a superconducting screen 3 which is arranged over the dielectric 2.

The cryostat KR is formed from two metallic tubes 4 and 5 which are arranged concentrically with respect to one another, are preferably composed of steel and can be corrugated transversely with respect to their longitudinal direction in order to improve the flexibility of the cryostat KR. Vacuum insulation 6 is fitted between the inner tube 4 and the outer tube 5 of the cryostat KR, using known technology.

The conductor 1 and the screen 3 have superconducting materials. With appropriate cooling, they are in the superconducting state during operation of the cable SK. However, the materials of the conductor 1 and screen 3 are different, to be precise such that, in the normally conductive state, the material of the screen has an electrical resistance value which is greater by a factor of at least 50 than that of the material of the conductor 1.

For this purpose, the majority of the screen 3 is advantageously composed of an oxidic superconducting material doped with rare earths. One such material is known by the name ReBCO (rare-earth barium-copper oxide). One material which is preferably used for the screen 3 is YBCO.

The conductor 1 is advantageously composed of BSSCO, and possibly electrical and mechanical stabilization composed of copper. Because of the high proportion of silver in the BSSCO, when it is in the normally conductive state, the conductor 1 has an electrical resistance value which is considerably lower than that of the screen 3. This effect can also be achieved when a combination of ReBCO, preferably YBCO, and copper is used for the conductor 1.

Because of the different materials for the conductor 1 and the screen 3, the arrangement according to the invention operates as follows:

In the event of a short circuit, the screen 3 of the cable SK very largely loses its screening function. The magnetic field produced by the conductor 1 in the cable SK can thus propagate virtually without any impediment, and directly results in a considerable increase in the inductance of the conductor 1, that is to say in an increase in its electrical impedance. The short-circuit current flowing via the conductor 1 is thus noticeably and quickly limited. The heating of the cable SK and its surrounding area produced by the short-circuit current is therefore kept relatively low, as a result of which the energy consumption for cooling down the arrangement after the short-circuit has been rectified is relatively low.

Figure 2:
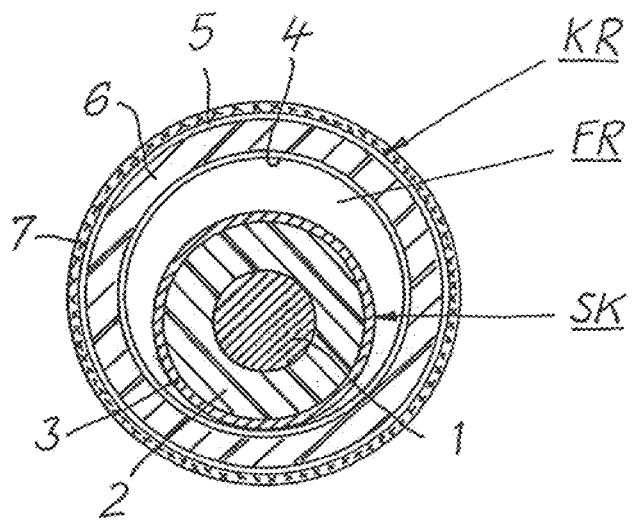
Figure 3:
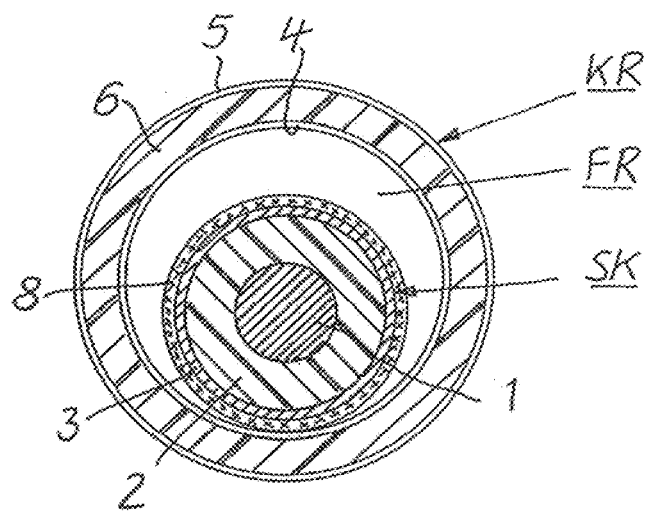

As shown in FIGS. 2 and 3, the cable SK may additionally have a layer composed of ferromagnetic material, which is arranged outside the screen 3:

As shown in FIG. 2, a layer 7 which is closed in the form of a tube and is composed of ferromagnetic material is fitted over the outer tube 5 of the cryostat KR. This layer 7 is present over the entire length of the arrangement and completely surrounds the circumference of the tube 5. The layer 7 is therefore a sheath which is closed in the form of a tube. In the event of a short-circuit, it enters the magnetic field produced by the conductor 1 in the cable SK and thus results in an additional increase in the inductance of the conductor 1, that is to say in a further increase in its electrical impedance. The effects explained further above are thus increased by the layer 7 composed of ferromagnetic material.

If the superconducting cable SK is an alternating-current cable, the effect of limiting the short-circuit current can be further enhanced by re-magnetization losses which may occur in the layer 7 composed of ferromagnetic material.

The layer 7 may be formed from a strip composed of ferromagnetic material, such as Magneperm, which is wound around the tube 5 with overlapping edges. This material has a relative permeability of $\mu_r$=450 000 at 50 Hz. The layer 7 could also be produced from a longitudinally running strip of a material such as this, which completely surrounds the tube 5 with an overlap point running in the longitudinal direction.

The wall thickness of the layer composed of ferromagnetic material is advantageously greater than 0.1 mm. The relative permeability $\mu_r$ of the ferromagnetic material is greater than 10.

Ferromagnetic materials are in general distinguished by a high relative permeability $\mu_r$. Irrespective of this, ferromagnetic materials have hysteresis losses which are caused by the area enclosed on the B-H diagram. Both variables are dependent on the material used. There is no correlation between $\mu_r$ and the hysteresis losses.

In one modified embodiment of the arrangement as shown in FIG. 2, instead of a separate or additional layer 7, the outer tube 5 of the cryostat KR may itself also be composed of ferromagnetic material, for example composed of a steel with a relative permeability of $\mu_r$=1000 at 50 Hz. Alloys composed of nickel and iron with small amounts of further additives are also suitable.

The important factor is that the layer composed of ferromagnetic material is arranged as a completely closed layer outside of the superconducting screen 3 in all embodiments, in order that it is located in the magnetic field of the conductor 1 in the event of a short-circuit. In a corresponding manner as shown in FIG. 3, it can also be arranged within the cryostat KR and can rest as a layer 8, for example externally, on the screen 3. As already mentioned, a material with very low hysteresis losses is advantageously used for the layer 8, as a result of which it is heated only insignificantly in the event of a short-circuit. The layer 8 can then be connected to the same potential as the screen 3. Analogously to FIG. 1, instead of the separate layer 8, the inner tube 4 of the cryostat KR may also be produced from ferromagnetic material. In this embodiment of the arrangement with ferromagnetic material located within the cryostat KR, the short-circuit current flowing in the conductor 1 is also limited as described for the arrangement shown in FIG. 1.

The invention claimed is:

1. Arrangement having a superconducting cable, which comprises:
   a superconducting conductor: and
   a superconducting screen which concentrically surrounds the superconducting conductor with the interposition of a dielectric, said cable being surrounded by a cryostat, enclosing a free space for a coolant to be passed through, the cryostat having two metallic tubes which are arranged concentrically with respect to one another and between which vacuum insulation is arranged, wherein the screen is composed of a superconducting material whose electrical resistance value in the normally conductive state is greater by a factor of at least 50 than the electrical resistance value of the material used for the conductor in the normally conductive state.

2. Arrangement according to claim 1, wherein the screen is composed of an oxidic superconducting material doped with rare earths.

3. Arrangement according to claim 2, wherein the screen is composed of YBCO.

4. Arrangement according to claim 1, wherein the conductor is composed of BSSCO, preferably with stabilization composed of copper.

5. Arrangement according to claim 1, wherein the conductor is composed of a combination of ReBCO and copper.

6. Arrangement according to claim 5, wherein the conductor is composed of a combination of YBCO and copper.

7. Arrangement according to claim 1, wherein a layer which is closed in the form of a tube and is composed of ferromagnetic material is additionally provided outside the screen over the entire length of the cable.

8. Arrangement according to claim 7, wherein the relative permeability of the ferromagnetic material is greater than 10.

9. Arrangement according to claim 7, wherein the layer composed of ferromagnetic material is applied externally to the outer tube of the cryostat.

10. Arrangement according to claim 7, wherein the outer tube of the cryostat is composed of ferromagnetic material.

11. Arrangement according to claim 7, wherein the ferromagnetic material is arranged within the cryostat.

12. Arrangement according to claim 11, wherein a layer composed of ferromagnetic material is applied externally to the screen.

13. Arrangement according to claim 11, wherein the inner tube of the cryostat is composed of ferromagnetic material.

* * * * *